(12) United States Patent
Lee et al.

(10) Patent No.: US 10,143,975 B2
(45) Date of Patent: Dec. 4, 2018

(54) THREE-LAYERED POROUS GRAPHENE MEMBRANE WITH SUPPORTER AND BONDING LAYERS

(71) Applicant: LG ELECTRONICS INC., Seoul (KR)

(72) Inventors: Changho Lee, Seoul (KR); Jeongil Kye, Seoul (KR); Hyung Gyu Park, Zurich (CH); Roman M. Wyss, Zurich (CH)

(73) Assignee: LG ELECTRONICS INC., Seoul (KR)

( * ) Notice: Subject to any disclaimer, the term of this patent is extended or adjusted under 35 U.S.C. 154(b) by 550 days.

(21) Appl. No.: 14/697,854

(22) Filed: Apr. 28, 2015

(65) Prior Publication Data
US 2015/0306550 A1 Oct. 29, 2015

(30) Foreign Application Priority Data

Apr. 29, 2014 (KR) .................. 10-2014-0051829

(51) Int. Cl.
| | | |
|---|---|---|
| B01D 39/00 | (2006.01) | |
| B01D 46/00 | (2006.01) | |
| B01D 67/00 | (2006.01) | |
| B01D 71/02 | (2006.01) | |
| B01D 69/06 | (2006.01) | |
| B01D 63/00 | (2006.01) | |
| B01D 65/00 | (2006.01) | |
| B01D 71/00 | (2006.01) | |
| C23C 14/00 | (2006.01) | |

(52) U.S. Cl.
CPC ....... B01D 71/021 (2013.01); B01D 67/0062 (2013.01); B01D 69/06 (2013.01); *B01D 2323/26* (2013.01)

(58) Field of Classification Search
USPC ..... 95/45; 96/4, 11, 12; 210/500.21, 500.25, 210/500.26, 500.27, 650
See application file for complete search history.

(56) References Cited

U.S. PATENT DOCUMENTS

| | | |
|---|---|---|
| 2013/0207238 A1 | 8/2013 | Cooper et al. |
| 2013/0270188 A1 | 10/2013 | Karnik et al. |
| 2014/0069277 A1 | 3/2014 | Choi et al. |
| 2014/0272286 A1* | 9/2014 | Stoltenberg ............. B32B 3/266 428/137 |
| 2015/0217219 A1* | 8/2015 | Sinsabaugh ........ B01D 67/0058 210/489 |

FOREIGN PATENT DOCUMENTS

| | | |
|---|---|---|
| KR | 10-2012-0130677 A | 12/2012 |
| WO | WO 2012/057702 A1 | 5/2012 |

OTHER PUBLICATIONS

International Search Report and Written Opinion dated Jul. 31, 2015 issued in Application No. PCT/KR2015/003709.

* cited by examiner

*Primary Examiner* — Hayden Brewster
(74) *Attorney, Agent, or Firm* — Ked & Associates, LLP

(57) ABSTRACT

Disclosed are a graphene membrane and a method for manufacturing the same. The graphene membrane includes a graphene layer having a porous pattern including a plurality of pores having a size of 5 to 100 nm and a supporter configured to support the graphene layer and including a plurality of pores having a greater size than the pores of the graphene layer.

6 Claims, 8 Drawing Sheets

THREE-LAYERED POROUS GRAPHENE MEMBRANE WITH SUPPORTER AND BONDING LAYERS

CROSS-REFERENCE TO RELATED APPLICATIONS

Pursuant to 35 U.S.C. § 119(a), this application claims the benefit of Korean Patent Application No. 10-2014-0051829, filed on Apr. 29, 2014, which is hereby incorporated by reference as if fully set forth herein.

BACKGROUND OF THE INVENTION

Field of the Invention

The present invention relates to graphene, and more particularly, to a graphene membrane and a method for manufacturing the same.

Discussion of the Related Art

In general, membranes are key materials and parts to execute separation and purification in applied fields, such as water treatment, energy, medical science, food, pharmacy, gas and the like.

Conventional membranes may be manufactured mainly using materials, such as polymers, ceramics and metals, and be classified into sheet-type flat membranes and tube-type hollow fiber membranes. Membranes using polymers, which are easily formed and relatively inexpensive, have been mainly used now.

Material separation using a membrane is carried out by an action in which a material to be removed does not permeate open pores of the membrane and a fluid to be purified (water, air and the like) permeates the pores.

Since a fluid permeates a membrane in such a manner, as the thickness of the membrane decreases, the amount of the fluid permeating the membrane may increase and, as the sizes of pores formed on the membrane become more uniform, a removal rate may increase and material removal may be stable.

Graphene is a representative material known as a monolayer and has high electrical conductivity and strength and thus, research thereon as a new electronic material is underway.

Since graphene is manufactured as a monolayer and has high strength, if pores are formed on graphene, graphene may be implemented as an ideal membrane having high permeability.

Theoretical research or idea to implement graphene as a membrane is carried out recently. However, graphene is a material which is difficult to treat and thus, a technique to effectively increase a porosity using graphene is required.

SUMMARY OF THE INVENTION

Accordingly, the present invention is directed to a graphene membrane and a method for manufacturing the same that substantially obviate one or more problems due to limitations and disadvantages of the related art.

An object of the present invention is to provide a graphene membrane which may have a high surface porosity using graphene.

Another object of the present invention is to provide a method for manufacturing a graphene membrane having a high surface porosity which may be mass-produced.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a graphene membrane includes a graphene layer having a porous pattern including a plurality of pores having a size of 5 to 100 nm and a supporter configured to support the graphene layer and including a plurality of pores having a greater size than the pores of the graphene layer.

Here, the surface porosity of the graphene layer may be 5 to 70%. The surface porosity may mean a ratio of an area occupied by the pores to the unit area of the graphene layer.

The supporter may include a non-woven fabric or a polymer.

Further, the supporter may be configured to discontinuously support the graphene layer.

The graphene membrane may further include a bonding layer disposed between the graphene layer and the supporter.

Here, the bonding layer may include a pattern including a plurality of pores having a size which is equal to or greater than the pores of the graphene layer.

The mean size of the pores of the graphene layer may be 5 to 50 nm. More properly, the mean size of the pores of the graphene layer may be 10 to 30 nm.

In another aspect of the present invention, a method for manufacturing a graphene membrane includes preparing a graphene layer located on a supporter, forming a porous block copolymer pattern on the graphene layer, and forming a porous pattern on the graphene layer using the porous block copolymer pattern.

The formation of the porous block copolymer pattern may include self-assembling a block copolymer, in which a first polymer and a second polymer are covalently bonded to each other, on the graphene layer and developing the block copolymer so as to form the porous pattern.

The self-assembly of the block copolymer, in which the first polymer and the second polymer are covalently bonded to each other, on the graphene layer may include spin-coating the first polymer and the second polymer in a dissolving state on the graphene layer and executing heat treatment on the spin-coated first and second polymers.

The development of the block copolymer may include radiating ultraviolet light to the block copolymer and executing acid treatment on the block copolymer.

The development of the block copolymer may include executing ion beam etching on the block copolymer.

The first polymer may be polystyrene and the second polymer may be PMMA.

The porous pattern may include a plurality of pores having a size of 5 to 100 nm.

The formation of the porous pattern on the graphene layer may include executing ion beam etching.

Here, the block copolymer may have a pattern of cylinder-shaped nano-structures.

The surface porosity of the graphene layer indicating a ratio of an area occupied by the pores to the unit area of the graphene layer may be 5 to 70%.

The method may further include removing the porous block copolymer pattern.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, embodiments of the present invention will be described in detail with reference to the accompanying drawings.

Reference will now be made in detail to the preferred embodiments of the present invention, examples of which are illustrated in the accompanying drawings. It will be appreciated that the technical spirit disclosed in the specification is not restricted by the accompanying drawings and includes various modifications, equivalents, and substitutions, without departing from the scope and spirit of the invention as disclosed in the accompanying claims.

If it is stated that an element is present "on" another element, it will be understood that the former may be directly present on the latter or other elements may be interposed between the two elements.

Further, in description of elements of the present invention, the terms "first", "second", etc. may be used. These terms are used only to discriminate one element, ingredient, area, layer and/or region from other elements, ingredients, areas, layers and/or regions, and the nature, order, or sequence of the corresponding element is not limited by these terms.

Figure 1:
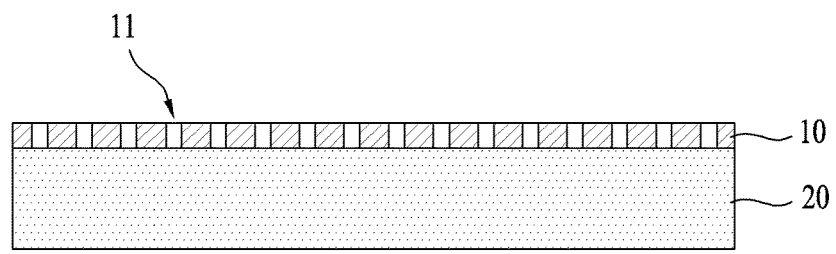
FIG. 1 is a schematic cross-sectional view illustrating a graphene membrane in accordance with one embodiment of the present invention.

FIG. 1 is a schematic cross-sectional view illustrating a graphene membrane in accordance with one embodiment of the present invention.

As exemplarily shown in FIG. 1, the graphene membrane may include a graphene layer 10 located on a supporter 20 and have a porous pattern including a plurality of pores 11.

Graphene has a structure in which carbon atoms form one atomic layer on a two-dimensional plane. The graphene layer 10 may form a state in which a single atomic layer is formed or plural atomic layers are stacked. Here, the respective atomic layers may be combined by binding force between molecules.

The porous pattern formed on such a graphene layer 10 may include a plurality of pores 10 having a size of 5 to 100 nm. The pores 11 may be formed in an about circular shape and thus, the size of the pores 11 may mean the diameter of the pores 11. However, if the pores 11 are not formed in a circular shape, the size of the pores 11 may mean the greatest length of the pores 11.

Further, the mean size of the pores 11 of the graphene layer 10 may be 5 to 50 nm. More properly, the mean size of the pores 11 of the graphene layer 10 may be 10 to 30 nm.

The surface porosity of the graphene layer 10 may be 5 to 70%. Here, a surface porosity means a ratio of an area occupied by the pores 11 to the unit area of the graphene layer 10.

As described above, the graphene layer 10 may have the porous pattern including a plurality of pores 11 having a size of 5 to 100 nm while simultaneously having the above-described surface porosity.

That is, if the pores 11 have a size of 5 to 100 nm and a surface porosity of 5 to 70%, the graphene layer 10 may act as an excellent functional membrane.

The supporter 20 supports the graphene layer 10 so as to act as a membrane and may include a plurality of pores having a greater size than the pores 11 of the porous pattern formed on the graphene layer 10.

Therefore, the supporter 20 may have a function of stably supporting the graphene layer 10 without an effect on the function of the graphene layer 10 as a membrane.

The supporter 20 may include a material having a net structure, for example, a non-woven fabric. Further, the supporter 20 may include a structure with a pattern of pores having a greater size than the porous pattern formed on the graphene layer 10. Such a structure may be formed of a polymer. However, the present invention is not limited thereto and any material, which may support the graphene layer 10 without lowering the function of the graphene layer 10 having the above-described porous pattern, may be employed.

Such a supporter 20 may continuously support the graphene layer 10, as exemplarily shown in FIG. 1. That is, the supporter 20 may be continuously provided so as not to expose the lower surface of the graphene layer 10 to the outside.

Figure 2:
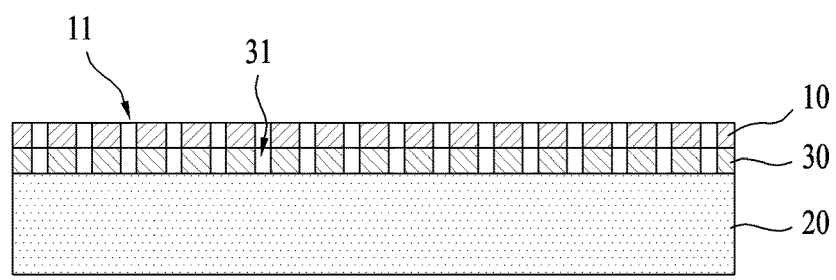
FIG. 2 is a cross-sectional view illustrating a graphene membrane in accordance with another embodiment of the present invention.

FIG. 2 is a cross-sectional view illustrating a graphene membrane in accordance with another embodiment of the present invention.

As exemplarily shown in FIG. 2, a bonding layer 30 may be further provided between a supporter 20 and a graphene layer 10. That is, such a bonding layer 30 may effectively fix the supporter 20 and the graphene layer 10.

The bonding layer 30 may have a lower molecular weight than a general polymer. Further, the bonding layer 20 may have a pattern of pores 31 having a size which is equal to or greater than a pattern of pores 11 of the graphene layer 10. That is, any material, which may bond the graphene layer 10 and the supporter 20 to each other without lowering the function of the graphene layer 10 having the porous pattern, may be applied to the bonding layer 30.

However, the bonding layer 30 may be omitted, as exemplarily shown in FIG. 1. That is, according to a specific treatment method, for example, according to surface treatment of the graphene layer 10 and/or the supporter 20, the graphene layer 10 may be directly bonded to the supporter 20.

Figure 3:
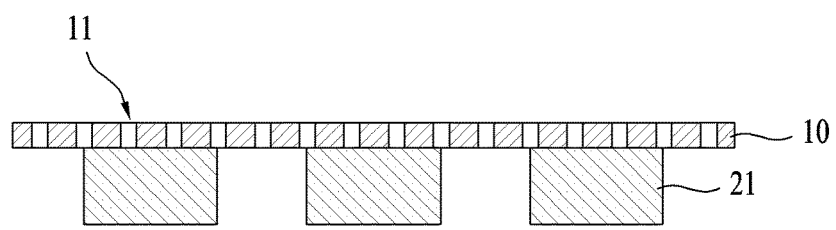
FIG. 3 is a cross-sectional view illustrating a graphene membrane in accordance with yet another embodiment of the present invention.

FIG. 3 is a cross-sectional view illustrating a graphene membrane in accordance with yet another embodiment of the present invention.

As exemplarily shown in FIG. 3, a supporter 21 may discontinuously support a porous graphene layer 10 having a pattern of pores 11.

That is, the supporter 21 may have a structure to expose at least a part of the graphene layer 10 contacting the supporter 21. Here, the supporter 21 may be bonded to the lower surface of the graphene layer 10 under the condition that areas of the supporter 21 are separated by designated intervals.

As the supporter 21 of a discontinuous type, a silicon substrate having holes may be used. In addition, ceramic, a dielectric, a metal and a polymer may be used as the supporter 21.

The membrane including such a graphene layer 10 may effectively act as a filter.

Material separation using such a membrane is carried out by an action in which a material to be removed does not permeate open pores of the membrane and a fluid to be purified (water, air and the like) permeates the pores.

Here, as the thickness of the membrane decreases, the amount of the fluid permeating the membrane may increase and, as the sizes of pores of the membrane become more uniform, a removal rate may increase and material removal may be stable.

As described above, since the graphene layer 10 in which a single atomic layer is formed or several atomic layers are stacked may be used as the membrane and the graphene layer 10 may have the pattern of the uniform pores 11, the effect of the graphene layer 10 as the membrane may be maximized.

That is, since the graphene layer 10 may include a monolayer and have high strength, the membrane including the graphene layer 10 having the pattern of the pores 11 may be implemented as an ideal membrane having high permeability.

FIGS. 4 to 13 are schematic cross-sectional views illustrating a process for manufacturing a graphene membrane in accordance with one embodiment of the present invention and FIG. is a flowchart illustrating a process for manufacturing a graphene membrane in accordance with one embodiment of the present invention.

Hereinafter, with reference to FIGS. 4 to 14, a process for manufacturing a graphene membrane will be described in detail. When the respective figures of FIGS. 4 to 13 are referred to, the flowchart of FIG. 14 will be simultaneously referred to.

Figure 4:
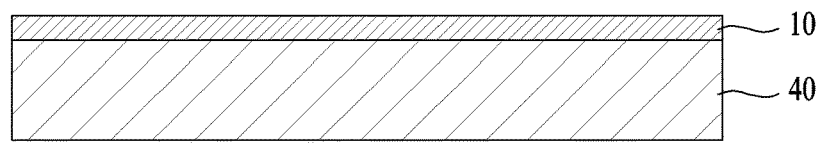
FIGS. 4 to 13 are schematic cross-sectional views illustrating a process for manufacturing a graphene membrane in accordance with one embodiment of the present invention.

In order to manufacture the graphene membrane, first, as exemplarily shown in FIG. 4, a graphene layer 10 is formed on a substrate 40 (Operation S10).

The substrate 40 may be formed of a catalytic metal. Ni, Co, Fe, Pt, Au, Al, Cr, Cu, Mg, Mn, Mo, Rh, Si, Ta, Ti, W, U, V, Zr and the like may be used as the catalytic metal, and the graphene layer 10 may be formed using chemical vapor deposition (CVD) on the catalytic metal. Hereinafter, the substrate 40 formed of a catalytic metal will be exemplarily described.

However, various other methods, such as rapid thermal annealing (RTA), atomic layer deposition (ALD) and physical vapor deposition (PVD), may be used to form the graphene layer 10.

Among these methods, in CVD, a catalytic metal 40 is located in a chamber, a carbon source is injected into the chamber and proper growth conditions are provided, thereby growing a graphene layer.

For example, as the carbon source, a gas, such as methane ($CH_4$) or acetylene ($C_2H_2$), a solid, such as a powder or polymer, and a liquid, such as bubbling alcohol, may be supplied.

In addition, various carbon sources, such as ethane, ethylene, ethanol, acetylene, propane, butane, butadiene, pentane, pentene, cyclopentadiene, nucleic acid, cyclonucleic acid, benzene, toluene and the like, may be used.

For example, copper (Cu) may be used as the catalytic metal 40 and methane ($CH_4$) may be used as the carbon source.

When methane gas is injected into the chamber in the hydrogen atmosphere while maintaining a proper temperature on the catalytic metal 40, methane and hydrogen react and thus, the graphene layer 10 is formed on the catalytic metal 40. Formation of such a graphene layer 10 may be carried out at a temperature of about 300 to 1,500° C.

Copper (Cu) used as the catalytic metal 40 has low solubility to carbon and may thus be advantageous in terms of formation of a graphene monolayer.

As circumstances require, the graphene layer 10 may be formed while a chemical vapor deposition apparatus continuously supplies the catalytic metal 40 through a roller.

Figure 5:
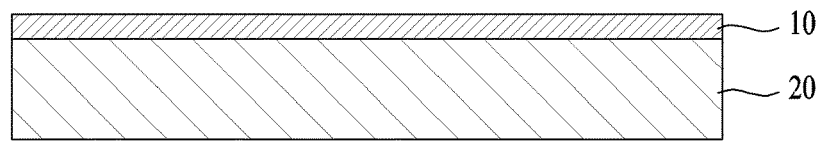

Thereafter, as exemplarily shown in FIG. 5, the graphene layer 10 formed on the catalytic metal 40 may be transcribed into a supporter 20 (Operation S20).

Transcription of the graphene layer 10 into the supporter 20 may be carried out by a general process. For example, transcription of the graphene layer 10 into the supporter 20 may be carried out by bonding the supporter 20 to the graphene layer 10 and then removing the catalytic metal 40.

Such a supporter 20 may have the above-described structure and characteristics. That is, the supporter 20 may include a material having a net structure, for example, a non-woven fabric. Further, the supporter 20 may include a structure with a pattern of pores having a greater size than a porous pattern, which will be subsequently formed on the graphene layer 10.

Thereafter, in order to form the pattern of pores on the graphene layer 10, a porous block copolymer pattern may be formed on the graphene layer (Operation S30).

Figure 6:
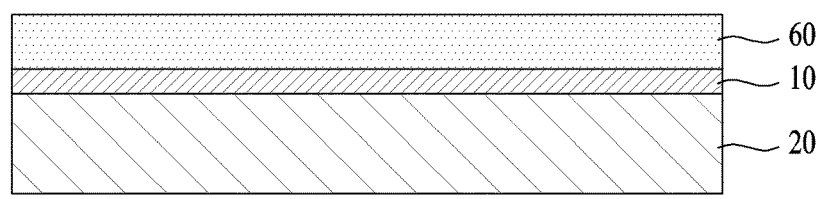
Figure 7:
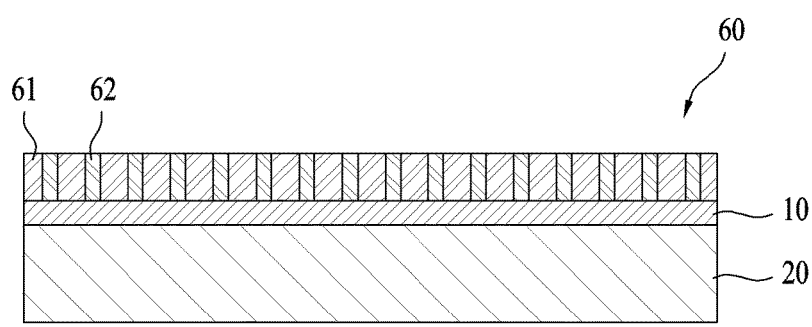

Formation of such a porous block copolymer pattern may include forming a block copolymer 60 in which a first polymer and a second polymer are covalently bonded to each other on the graphene layer 10, as exemplarily shown in FIG. 6, and self-assembling the block copolymer 60, as exemplarily shown in FIG. 7.

The block copolymer 60 means a form in which polymers having different characteristics are covalently bonded to each other. According to compositions between blocks forming the block copolymer 60, the lengths of chains and mutual attraction coefficients, basic structures, such as lamellas, cylinders, and spheres, or various other three-dimensional nano-structures may be formed.

The block copolymer 60 formed in a thin film on the graphene layer 10 has fluidity at more than a glass transition temperature, and nano-structures (particularly, lamellas or cylinders) formed by self assembly may be arranged in a specific pattern on the graphene layer 10 so a to minimize free energy due to interfacial and surface attraction between the block copolymer 60 and the graphene layer 10.

Figure 8:
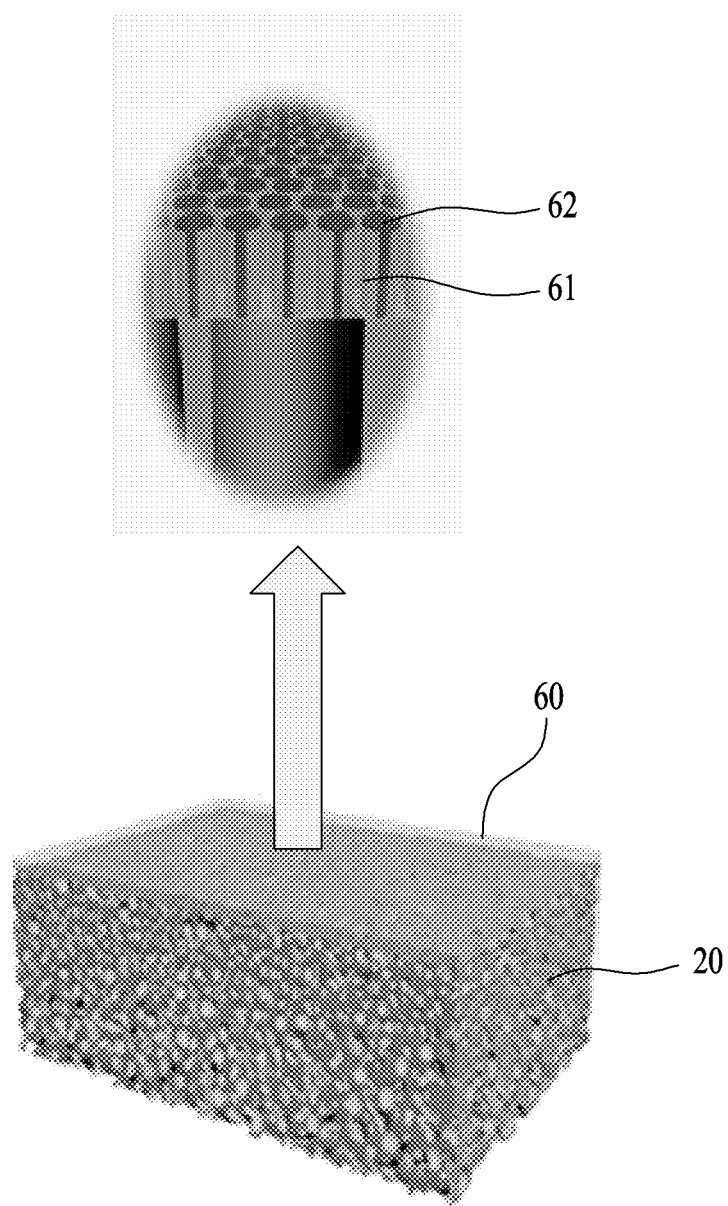

FIG. 8 illustrates one example of the self-assembled block copolymer 60 located on the supporter 20. Here, the graphene layer 10 is omitted.

As exemplarily shown in this figure, the block copolymer 60 may have a pattern of nano-structures of a cylinder type.

Here, a first polymer 61 and a second polymer 62 are self-assembled so as to form a nano-pattern. The first polymer and the second polymer 62 may be used in a regular ratio according to the size of a pore pattern which will be formed on the graphene layer 10 and the surface porosity of the graphene layer 10.

For example, in order to form the pattern shown in FIG. 8, the first polymer 61 and the second polymer 62 may be used in a mass ratio of 85:15.

Here, for example, the first polymer 61 may be polystyrene and the second polymer 62 may be PMMA.

Hereinafter, a process for forming a pattern of the porous block copolymer 60 to form the pore pattern on the graphene layer 10 will be described in detail.

First, the first polymer 61 and the second polymer 62 in a mass ratio of 85:15 which dissolve in toluene are spin-coated on the graphene layer 10 to a thickness of about 40 nm.

Thereafter, the first polymer 61 and the second polymer 62 are self-assembled through heat treatment at a temperature of 180° C. for 24 hours, thus forming a nano-pattern in which the first polymer 61 and the second polymer 62 are arranged in a cylinder shape, as exemplarily shown in FIGS. 7 and 8.

Figure 10:
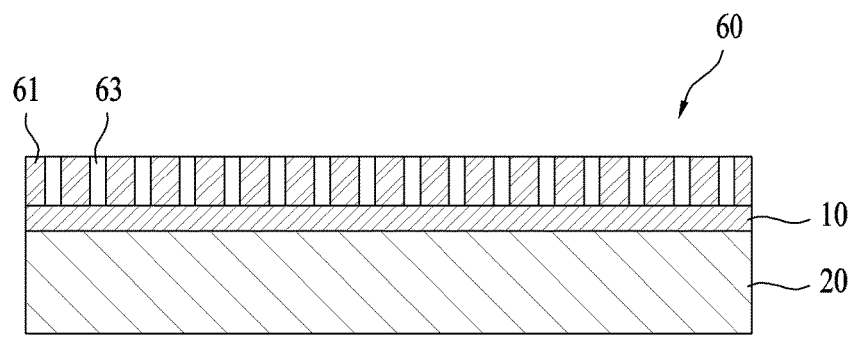

Thereafter, such a nano-pattern is developed, thus forming a porous pattern shown in FIG. 10. A process for forming such a porous pattern may be carried out as described below.

First, ultraviolet (UV) light is radiated and thus breaks covalent bonds between the first polymer 61 and the second polymer 62.

Thereafter, the second polymer (PMMA) 62 is developed through acid treatment and thus forms a porous block copolymer pattern having the structure shown in FIG. 10.

Figure 9:
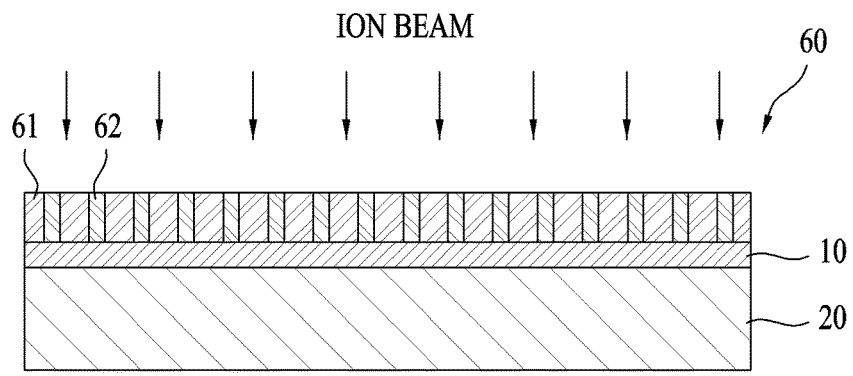

The process for forming the porous pattern may be formed through ion beam etching, as exemplarily shown in FIG. 9, and such ion beam etching may be executed together with the above-described process.

Figure 11:
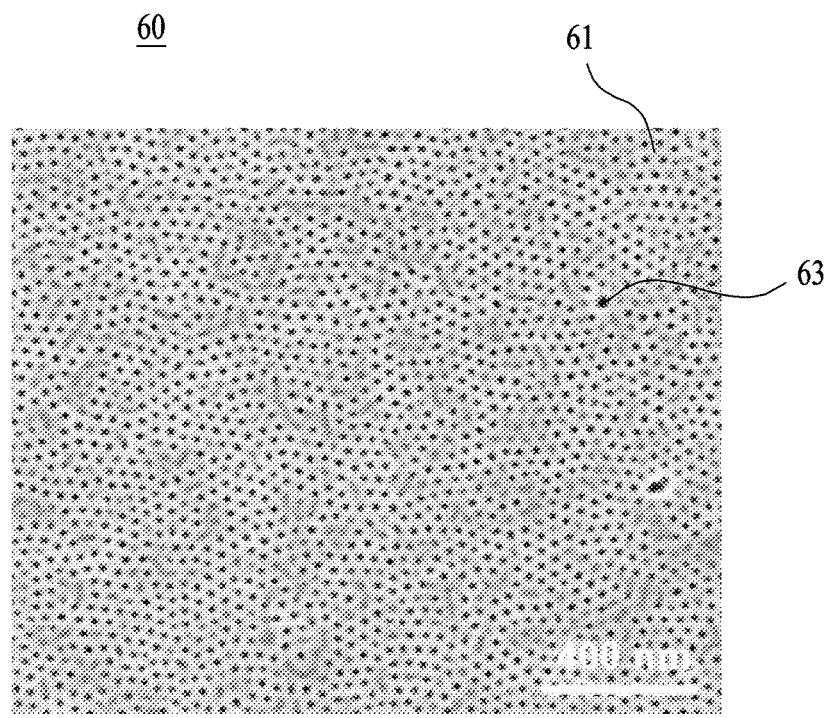

When such a nano-pattern is formed in such a manner, the second polymer 62 is removed and the porous block copolymer pattern having a plurality of pores 63 within the first polymer 61 may be formed, as exemplarily shown in FIGS. 10 and 11.

FIG. 11 is a photograph illustrating the pattern of the porous block copolymer 60. From the photograph, it may be understood that a pattern having a plurality of pores 63 is formed within the first polymer 61.

Such a porous block copolymer pattern is a porous pattern having a high porosity and may have a pore size of 5 to 100 nm according to material ratios of the copolymer 60.

The mean size of the pores 63 may be 5 to 50 nm, and more properly, be 10 to 30 nm. Further, the surface porosity of the block copolymer 60 may be 5 to 70%. Here, a surface porosity means a ratio of an area occupied by the pores 63 to the unit area of the block copolymer 60.

As described above, the block copolymer 60 may have the porous pattern including a plurality of pores 63 having a size of 5 to 100 nm while simultaneously having the above-described surface porosity.

That is, the block copolymer 60 may have the porous pattern having a pore size of 5 to 100 nm and a surface porosity of 5 to 70%.

Thereafter, a porous pore pattern is formed on the graphene layer 10 using the above-described pattern of the block copolymer 60 (Operation S40).

Figure 12:
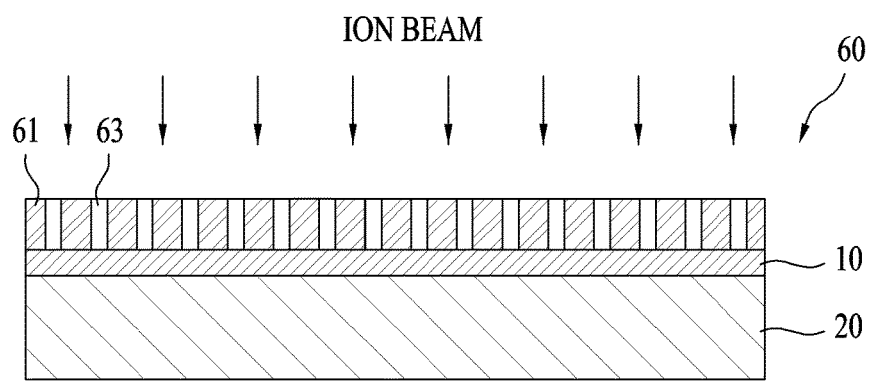

Formation of the porous pore pattern may include executing ion beam etching using oxygen, as exemplarily shown in FIG. 12.

Figure 13:
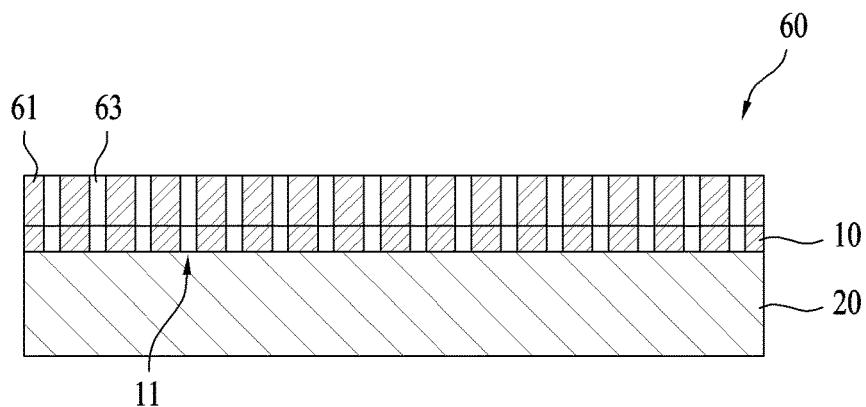
Figure 14:
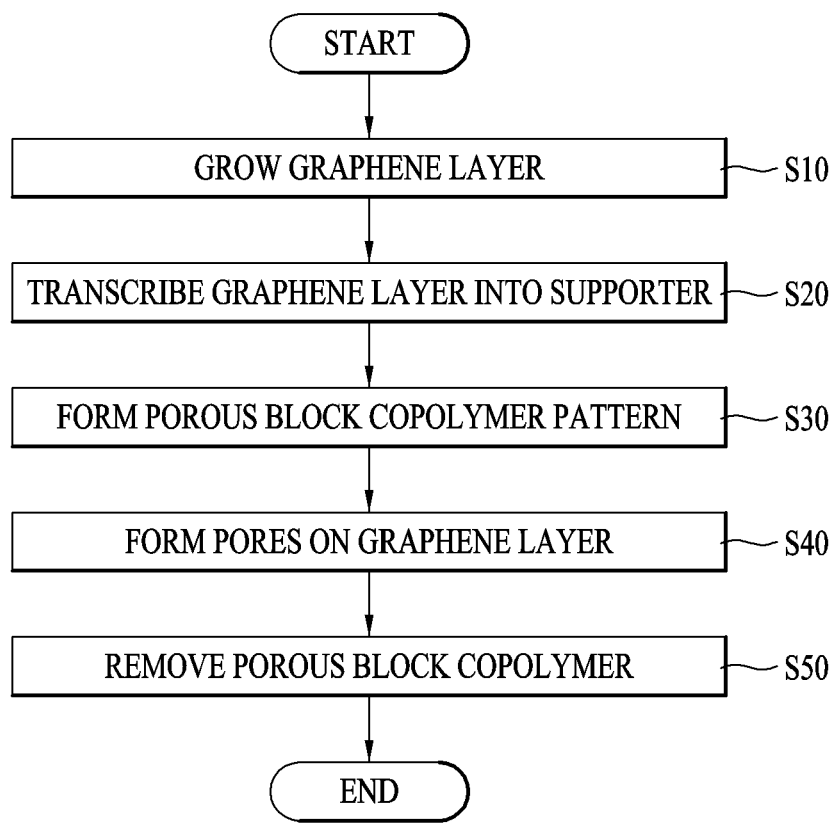
FIG. 14 is a flowchart illustrating a process for manufacturing a graphene membrane in accordance with one embodiment of the present invention.

As exemplarily shown in FIG. 13, a pattern of pores 11 which is the same as the pattern of the block copolymer 60 may be formed on the graphene layer 10 through the above process. That is, since the pattern of the pores 11 is formed on the graphene layer 10 in a state in which the block copolymer 60 serving as a mask is attached closely to the graphene layer 10, the pattern of the pores 11 having a high porosity may be formed.

That is, as described above, the graphene layer 10 may have a pore size of 5 to 100 nm.

The mean size of the pores 11 of the graphene layer 10 may be 5 to 50 nm, and more properly, be 10 to 30 nm. Further, the surface porosity of the graphene layer 10 may be 5 to 70%.

As described above, the graphene layer 10 may have the porous pattern including a plurality of pores 11 having a size of 5 to 100 nm while simultaneously having the above-described surface porosity.

Thereafter, removal of the block copolymer 60 (Operation S50) may be performed. When the block copolymer 60 is removed, the above-described graphene membrane shown in FIGS. 1 to 3 may be formed.

Removal of the block copolymer 60 may be carried out by dissolving the block copolymer 60 in a proper solvent or burning the block copolymer 60 at a high temperature.

As circumstances require, the pattern of the block copolymer 60 may not be removed.

As apparent from the above description, the present invention provides a membrane designed to have a desired porosity, thus realizing a sufficient porosity and a uniform pore size and distribution.

Further, a high efficiency membrane having a monomer thickness which may not be implemented using conventional materials, such as polymers, ceramics and metals, may be acquired.

Further, since a block copolymer pattern is used and may thus be attached closely to a graphene layer, a method for manufacturing a graphene membrane having high precision without damage to the graphene layer may be provided.

Moreover, a method for manufacturing a graphene membrane which is mass-produced may be provided.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A graphene membrane comprising:
   a graphene layer having a porous pattern including a plurality of pores having a size of 5 to 100 nm the graphene layer having a membrane function; and
   a supporter configured to support the graphene layer and including a plurality of pores having a greater size than the pores of the graphene layer, and
   a bonding layer that bonds the graphene layer and the supporter to each other, the bonding layer provided between the graphene layer and the supporter without lowering the membrane function of the grapheme layer,
   wherein the bonding layer includes a pattern including a plurality of pores having a size which is equal to or greater than the pores of the graphene layer,
   wherein a surface porosity of the graphene layer indicates a ratio of an area occupied by the pores to the unit area of the graphene layer is 5 to 70%,
   wherein the supporter includes a polymer, and wherein the bonding layer has a lower molecular weight than the polymer of the supporter.

2. The graphene membrane according to claim 1, wherein the supporter includes a non-woven fabric or a polymer configured to continuously support the graphene layer.

3. The graphene membrane according to claim 1, wherein the supporter is configured to discontinuously support the graphene layer.

4. The graphene membrane according to claim 3, wherein the supporter configured to discontinuously support the graphene layer includes at least one of silicon, ceramic, a dielectric, a metal, or a polymer provided with holes.

5. The graphene membrane according to claim 1, wherein the mean size of the pores of the graphene layer is 5 to 50 nm.

6. The graphene membrane according to claim 3, wherein areas of the supporter are separated by designated intervals.

* * * * *